Figure 1:
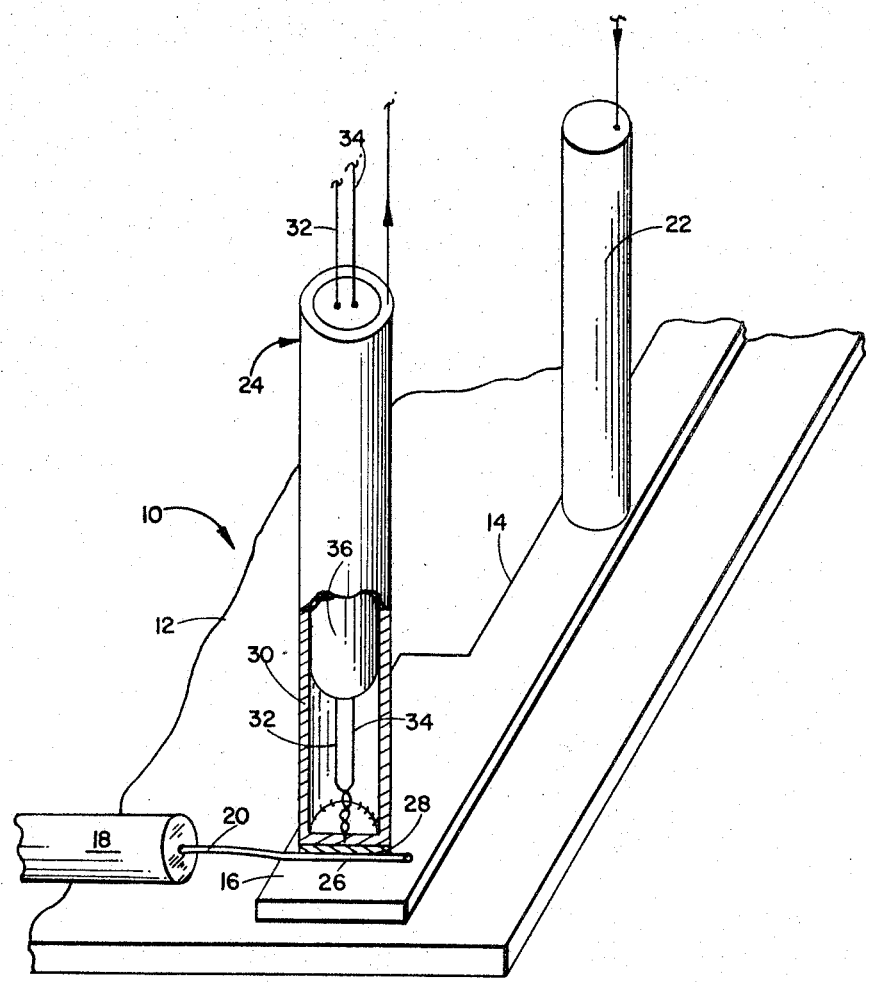

March 14, 1967 R. J. HEBERT ETAL 3,309,494
BONDING APPARATUS
Filed June 12, 1963 4 Sheets-Sheet 3

INVENTORS
ROY J. HEBERT
SAM J. GRIFFIN
BY
*Sidney Magnes*
AGENT

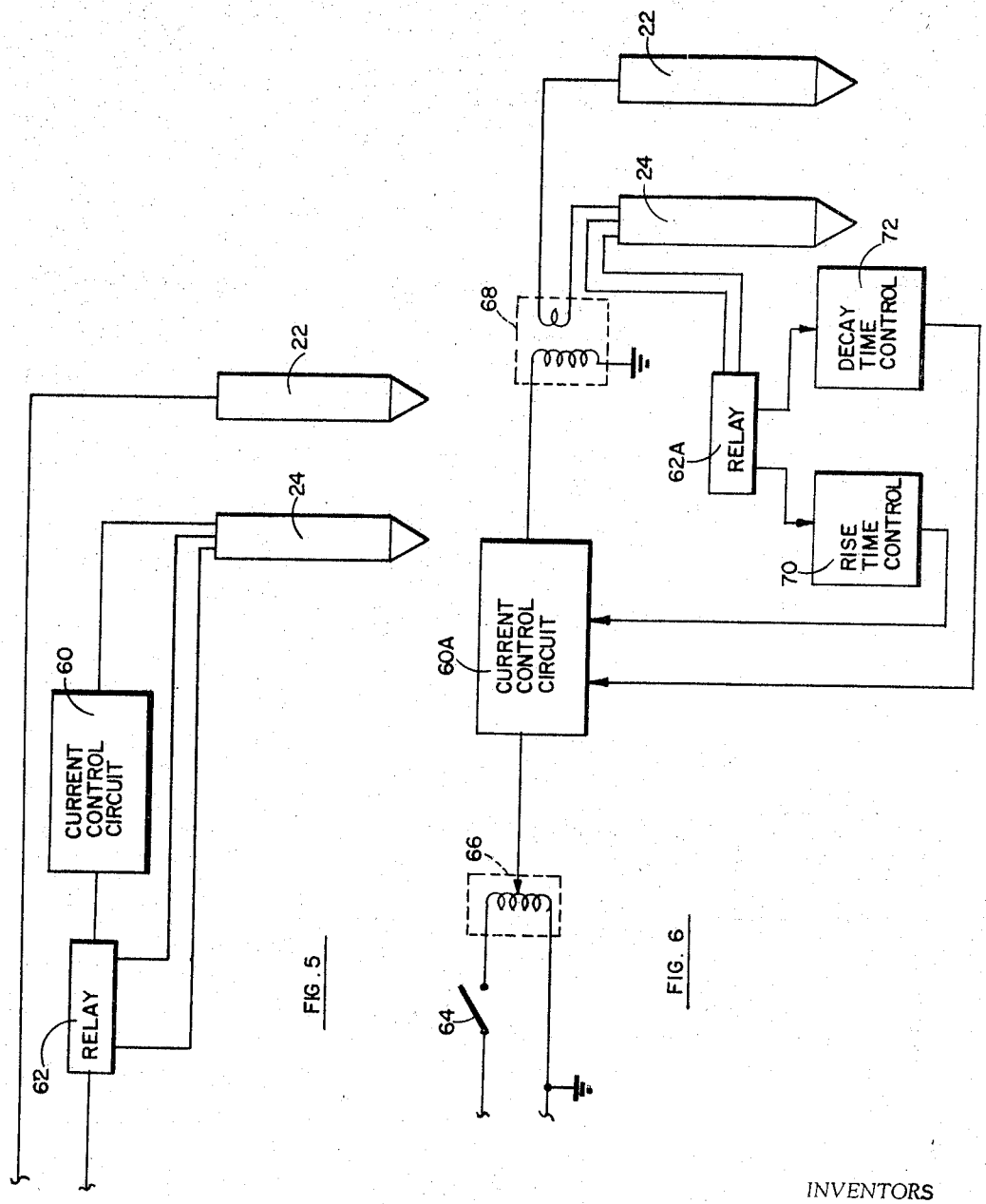

3,309,494
BONDING APPARATUS
Roy J. Hebert, Garden Grove, and Sam J. Griffin, La Habra, Calif., assignors to North American Aviation, Inc.
Filed June 12, 1963, Ser. No. 287,333
2 Claims. (Cl. 219—85)

This invention relates to bonding method and apparatus therefor; and more particularly to a soldering operation and apparatus therefor.

Background

It is well known in the electronics art, that electricity must be conducted from one place to another; and to electronic components, such as transistors, resistances, coils, and the like. So-called "lead wires" are used to lead the electricity to and from the component, and to and from other parts of the circuitry; and these lead wires must be bonded to other lead wires, or to other wires that are part of the electronic circuitry.

The bond between the various wires must have several characteristics: namely, it must have low electrical-resistance; it must be reliable; it should have good mechanical strength; it should have a long useful life; it should withstand rough handling, vibration, etc.; it should not be unsightly; and, under conditions to be explained later, it must be extremely small.

There are many methods of providing these bonds, among them being welding, diffusion-bonding, and soldering. Of these various methods, soldering has the longest history; has been extremely satisfactory; and promises to be the most economical.

In the usual soldering operation, the materials to be bonded are held together and heated. When the temperature has been raised to a sufficiently-high value, a wire or bar of solder is touched to the heated joint. The solder melts, and flows between the elements to be soldered. Alternatively, the parts may be solder "plated"; or may have a separate sheet of solder suitably pre-positioned.

The characteristics of molten solder are such that it "wets," and flows between the surfaces of the materials to be bonded. When the heat is removed, the molten solder solidifies, and forms a bond that has most of the desired characteristics.

The soldered connection has an important advantage over other methods; namely, it may be unsoldered when desired. For example, if a component is discovered to be defective, a soldered joint can be reheated until the solder melts; and the electronic component can then be removed.

Component-removal is extremely difficult with other types of bonds, as they cannot be readily taken apart.

In order to produce a good solder-joint, it is essential that the solder, and the materials to be soldered together, are heated to a high enough temperature so that the solder truly melts, wets the surfaces, and flows along the adjacent surfaces to be bonded.

It is also necesary that the materials being soldered be held securely while the solder solidifies; otherwise their movement causes minute cracks in the solder, leading to a mechanically-weak relatively high-electrical-resistance joint, and a gray unsightly appearance.

One other requirement should be noted. If the soldered joint has been properly heated, but cools too quickly, the solder assumes a crystalline form that also tends to have a relatively weak mechanical strength, a relatively high electrical-resistance, and a gray unsightly appearance.

From the above description it will be understood that a shiny surface is one indication that the soldered joint is satisfactory. This visual inspection offers the soldering method another advantage over other bonding methods; namely, a skilled operator can generally verify, by visual examination alone, whether or not the soldered joint is satisfactory.

Modern concepts in the electronic art are dispensing with the use of wires, and instead use a substrate of material such as plastic or ceramic, onto which is formed stripes of electrically-conductive material such as copper, gold, platinum, or the like. This arrangement is known as a "printed-wiring" board, because the conductive stripes look like printed stripes, and still act as wires. One advantage of the printed-wire concept is that it permits the circuitry to be miniaturized; but this very miniaturization, unfortunately, limits the bonding to a very small area.

It is frequently necessary to solder either the lead wires of an electronic component, or "jumper" wires, to portions of the printed wire circuitry; and for this purpose various printed wires contain an enlarged area known as a "termination-pad" since it acts as an electrical terminal. In order to simplify the soldering operation, the wires, the pads, and the printed-wire stripes, are usually coated with solder.

In any bonding procedure, however, one very important consideration must be observed. This consideration is that the electronic component should not be overheated; as this would tend to destroy it.

The problem of overheating is particularly critical when miniaturized electronic components are used; these being so small that they are easily overheated without the operator's knowledge.

If the operator were to avoid high temperatures in an attempt to prevent overheating the components, the resultant lower temperatures would tend to produce a poor solder-joint. Thus, extremely skillful operators are required for hand-soldering miniaturized electronic components and circuitry.

Objects and drawings

Figure 2:
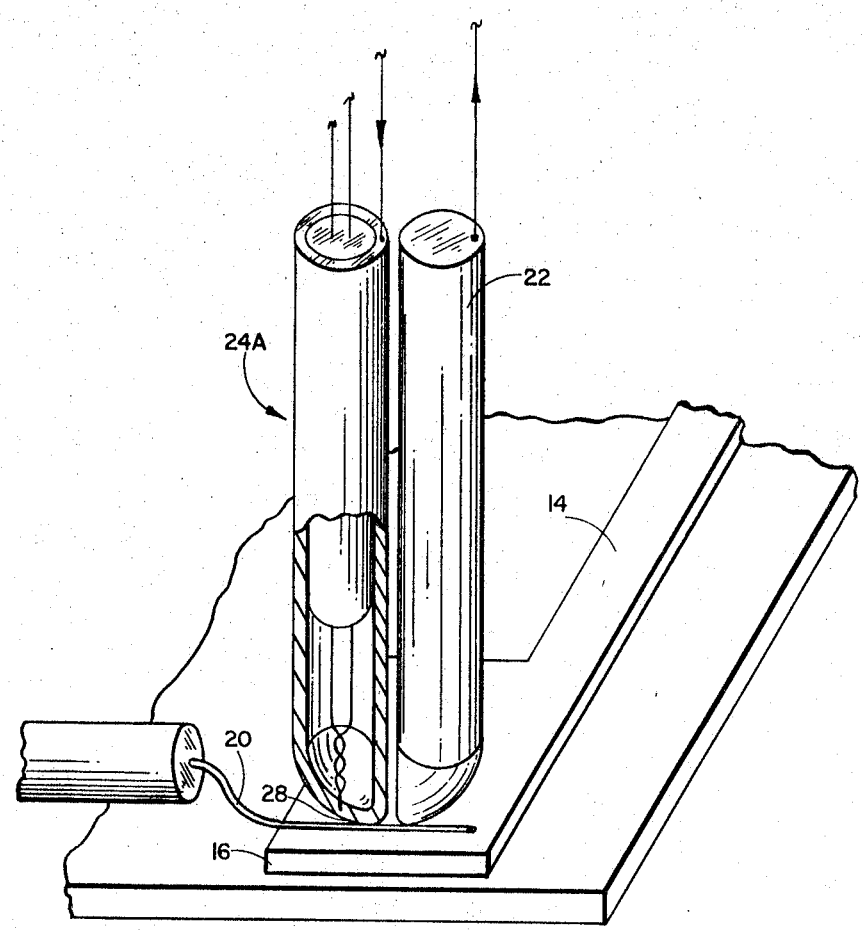
Figure 3:
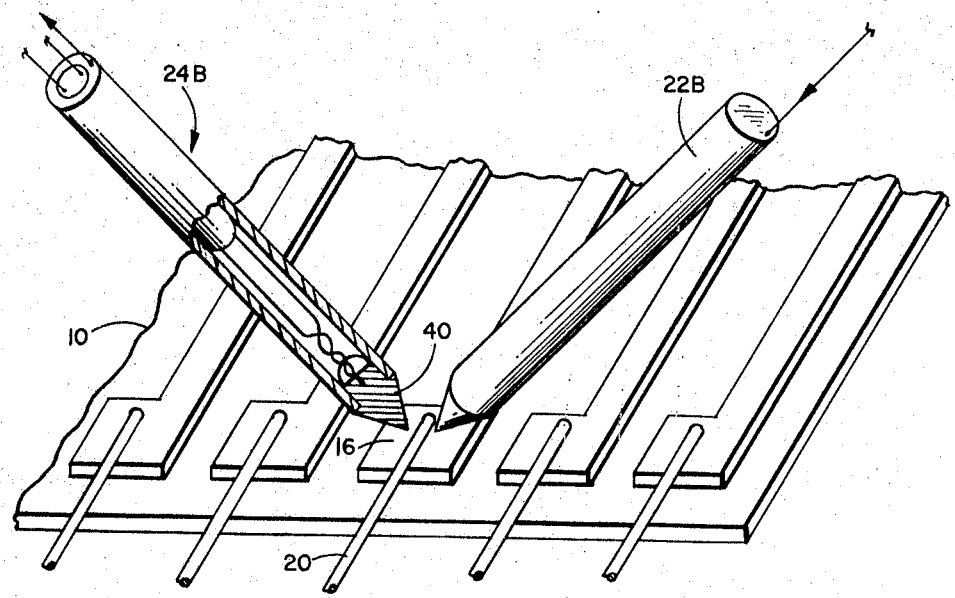
Figure 4:
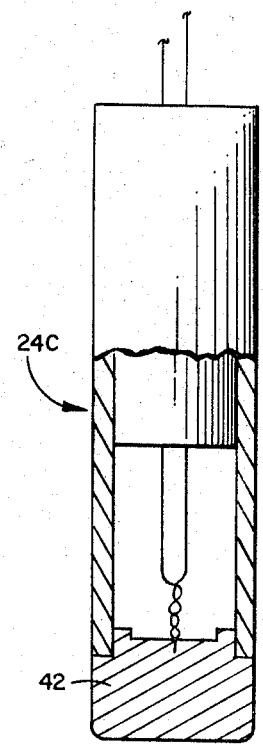

It is therefore the principal object of this invention to provide an improved bonding apparatus. It is an additional object of this invention to provide improved processes for bonding and soldering elements together. The attainment of this object and others will be realized from the following specification, taken in conjunction with the drawings of which FIGURE 1 shows the basic inventive concept;
FIGURES 2-4 show other ways of practicing the invention; and
FIGURES 5-6 show control circuitry.

Synopsis

The basic concept of the instant invention is to obtain an indication of the instantaneous temperature at the bonding area, while the bond is being formed; and to use this indication to control the bonding process. If the temperature is too low, more heat is generated, whereas if the temperature is too high, the heat is interrupted in order to prevent overheating of the bonding area and the component.

The present invention contemplates a bonding electrode that comprises a thermocouple to indicate the temperature at the bonding area. The electrode may comprise a sheathed thermocouple, wherein the metallic sheath is used as part of the heating circuit, while the thermocouple is used to monitor the temperature of the bonding area.

The present invention also contemplates circuitry for controlling the heating and cooling rates of the bonding area, so that it is heated in the shortest possible time, but is not cooled so quickly that an unsatisfactory bond is produced.

Moreover, the bonding area is maintained at the soldering temperature for only the minimum length of time, so that the component and the printed wiring board are not overheated.

The principles, apparatus, process, and means for accomplishing the above will be explained and disclosed.

Introduction

There are three principal methods of heating the area to be soldered.

One of these is to use a soldering-iron, which comprises a metallic rod that is heated by means, such as a heating coil. The heat from the heating coil heats the rod, whose tip is pressed upon the elements to be soldered. In this way, the tip of the soldering iron holds together the elements, and simultaneously heats them. Solder at the heated area melts, to flow around the elements to be soldered together.

This procedure has several disadvantages. The first is that the use of the soldering iron tends to overheat or to prolong the heating period, and thus degrade the electronic components. Second, the soldering iron is hot, and tends to burn, char, or damage any adjacent component, insulation, printed-wire board, or other element it touches. Another disadvantage results from the fact that when the soldering iron is raised from the heated bonding area in order to permit the bonding area to cool, the retaining pressure produced by the soldering iron is removed from the elements being soldered together, and they tend to separate; thus producing one of the unsatisfactory joints previously described. Still another disadvantage is due to the fact that when the soldering iron is removed, the joint tends to cool at a rate determined by its physical characteristics. For example a joint that has a heavy lead wire, a large amount of solder, and a large substrate, cools at a rate depending upon the temperature of these various elements. If these elements are relatively cool, the soldered joint cools quickly; whereas if these elements happen to have been heated to a high temperature by the soldering iron, the soldered joint will cool relatively slowly. As previously discussed, the rate of cooling exerts a large influence on the quality of the solder-joint.

A second method of soldering is to use a device that sends electricity through a hairpin-like wire, that thereupon becomes hot. This second way avoids burning or charring adjacent elements, and will hold the parts in place while cooling; but has the other disadvantages.

A third method of soldering is known as "resistance-soldering." In this type of soldering, electricity is passed through two or more juxtaposed elements. At their "interface," that is the area where the elements touch, the relatively high electrical resistance produces an appreciable amount of heat; and this heat warms the area to the temperature at which the solder melts.

Resistance soldering has an advantage in that the heat is developed only at the bonding area, and that adjacent elements cannot be accidenlly burned or charred. Moreover, when the current flow is interrupted to permit cooling of the soldered joint, the resistance-soldering electrodes can remain fixedly-positioned. They thus prevent the elements from moving; and thus produce a properly-cooled and a sightly soldered-joint.

Description of the invention

The invention may be understood from FIGURE 1. This shows a printed-wiring board, 10, that comprises a substrate 12 having a printed-wire pattern thereon. A portion of the printed-wire pattern is indicated by reference character 14, and has a termination pad 16. An electronic component 18 has a lead wire 20, which is to be soldered to pad 16.

In order to perform resistance soldering, two electrodes are used. One of these, 22, may be solid, and receives electricity from a source (not shown); the electricity flowing down the solid electrode 22, along printed-wire 14, up through the thickness of lead 20, through a temperature-sensing electrode 24 (to be described more fully later), and back to the source.

As may be seen from FIGURE 1, one interface 26 is formed between pad 16 and lead wire 20, and a second interface 28 is formed between lead wire 20 and the working end of the temperature-sensing electrode 24. As the "heating"-current flows through the previously-described circuit, it generates heat at these two interfaces; this heat raising the temperature of the bonding area so that solder melts to form the soldered joint.

The temperature-sensing electrode 24 most conveniently comprises a "sheathed-thermocouple," which comprises three elements.

The first is a sheath 30. For the purpose of the invention, the sheath should be electrically-conductive; but of a material such as stainless steel or Inconel, that is not readily solderable, in order to prevent a soldered joint between the sheath and the lead wire 20. ("Inconel" is a trade name for a product of the International Nickel Company.)

The second element is a pair of "thermocouple" wires 32, 34. Each wire is formed of a different material, the wires being joined together at their ends. When the twisted or joined ends are exposed to heat, the thermocouple wires produce a voltage between them, this voltage being an indication of the temperature at the twisted thermocouple end. The pair of wires may be of any desired type, such as copper-constantan, iron-constantan, or other wires of suitable composition.

The third element of the sheathed-thermocouple is an insulation 36, such as magnesium oxide or aluminum oxide, that fills the inside of the sheath, and separates the thermocouple wires from each other and from the sheath.

The temperature-sensing electrode 24 may be formed by twisting together the thermocouple wires 32 and 34; peening-over the periphery of the sheath 30 to form a closed end; and then welding or brazing together the closed end of the sheath and the twisted ends of the thermocouple wires. The welding or the brazing operation is also used to thicken the closed end and provide a longer-lived working surface. This structure permits the heating-electricity to flow through the sheath of the temperature-sensing electrode 24; and yet permits the thermocouple end to be in intimate contact with the bonding area, and to thus indicate the instantaneous temperature by means of the voltage produced between thermocouple wires 32 and 34.

It is not essential that the first electrode 22 be a solid rod. It may be a clamp or a clip; or in cases where a plurality of lead wires extend outwardly from the edge of the board 12, they may fit into positioning grooves of a metallic holding jig that serves as the first electrode.

The temperature-sensing electrode 24 of FIGURE 1 is quite satisfactory when there is sufficient room. In some cases however, particularly in miniaturized circuitry, the location of the termination pads, or the inaccessibility of a printed-wire such as 14 makes it desirable that the electrodes be fixed-spaced, and close together. Under these conditions, it has been found that the temperature-sensing electrode 24 is too bulky; and therefore the arrangement of FIGURE 2 was devised.

The electrode 24A is substantially the same as that previously shown, except that it has an angled, or tapered end, rather than a blunt end. If the other electrode 22A is similarly angled, the two working ends may be placed extremely close together in order to form a heating circuit through a portion of lead wire 20 positioned on termination pad 16.

In this case the lead wire 20 is part of the heating circuit, and heat is developed at the interface between the lead wire and the electrode. This heat is conducted to the termination pad, and heats the entire bonding area.

In the use of still-further miniaturized circuitry, known as "microminiaturized" circuitry, the size of the termination pads is reduced so much that it becomes necessary to place the tips of the electrodes even closer together.

In addition, some lead-wires are so fine that they cannot carry the heating current without overheating.

Furthermore, experience has shown that the portion of the sheath that is peened-over to form the end of the temperature-sensing electrodes soon wears through under use.

FIGURE 3 shows another arrangement for use under those conditions. Here, a longer-lived temperature-sensing electrode 24B comprises the previously-described sheath and thermocouple; the working tip now comprising a suitably-shaped insert 40.

In FIGURE 3 the inserted tip 40 is an angled, conically-shaped configuration that permits the concentration of heat into a very small area.

In use, the two electrodes may be placed in a V-shaped arrangement to place the tips as close together as possible, while the separated ends permit mounting and electrical connections. The tips may straddle the lead wire 20, in which case the heat is conducted to it; or one tip may be positioned on the lead wire while the other tip is positioned on the termination pad 16.

With this arrangement the printed-wire board may be stepped-along so that successive lead wires are soldered in place.

The temperature-sensing electrode 24C of FIGURE 4 has a flat-bottomed insert 42 that permits the heat to be applied to a somewhat larger flat area, when this is desired.

It has been found that for a termination pad about .050" wide and a lead wire of .016" diameter, a satisfactory electrode has a diameter of .060" (about the thickness of the lead in an ordinary lead pencil).

FIGURE 5 shows one relatively simple circuit for achieving the desired temperature control.

Energy from a source (not shown) passes through one electrode 22; through the bonding area; through the temperature-sensing electrode 24; through a heating-current-control circuit 60; and through a control device 62, such as a transistor or a relay, back to the source. The thermocouple in the temperature-sensing electrode 24 measures the temperature at the solder area, and produces an output signal that controls the state of a relay 62.

If the temperature is relatively low, the low output from the thermocouple keeps relay 62 in a state that causes a heating current to flow through the resistance-soldering circuit. As soon as the temperature at the soldering-area becomes warm enough, it is sensed by the thermocouple in the temperature-sensing electrode. The output from the thermocouple changes the state of relay 62, which thereupon breaks the heating circuit. As a result, heating current is no longer permitted to flow through the resistance-soldering electrodes; and the soldered joint is prevented from overheating, and permitted to cool.

Of course, an adjustable temperature may be provided by controlling the output of the thermocouple, as by the use of a potentiometer; or by using a sensitivity-controlled relay or transistor.

In this way the temperature at the solder joint is permitted to rise to its optimum solder temperature, but is stopped at that point, so that the electronic components are in no danger of being overheated.

FIGURE 6 shows an improved apparatus for controlling the temperature at the solder area. Here a master switch 64 is energized to activate the circuit; a variable transformer 66 is adjusted to control the maximum current to be used; and a step-down transformer 68 sets the voltage that is actually applied to the resistance-soldering circuit.

The thermocouple in the temperature-sensitive electrode 24 operates a relay 62A as previously explained; the relay this time energizing two separate circuits. The first of these, known as a rise-time control circuit 70, operates during the heating portion of the soldering operation. It comprises an envelope-shaping circuit that cooperates with the current-control-circuit 60A to control the time-duration and the magnitude of the heating current as the heating current increases to its maximum value.

The second circuit 72, known as a decay-time control circuit, operates during the cooling portion of the soldering operation. It too comprises an envelope-shaping circuit that cooperates with current-control-circuit 60A to control the time-duration and the magnitude of the heating current as it decays from its maximum value.

Thus, by controlling the rise time, the circuitry prevents the solder area and the components from becoming too hot; and by controlling the decay-rate, the circuitry prevents the solder joint from cooling too rapidly.

While the foregoing explanation has been presented in terms of soldering a lead wire to a printed wire pattern, it is apparent that the invention can be used for other purposes. For example, under many conditions a heat-sensitive component must be bonded to terminals other than a printed wire pattern; while under other conditions wires must be bonded to a terminal that is adjacent to a heat-sensitive material such as rubber or plastic. In these cases, and in others, the present invention assures that a relatively unskilled operator will produce a satisfactory bond in a crowded environment without endangering the component, adjacent elements, or heat-sensitive support structures.

Although the invention has been illustrated and described in detail, it is to be clearly understood that the same is by way of illustration and example only and is not to be taken by way of limitation, the spirit and scope of this invention being limited only by the terms of the appended claims.

We claim:

1. A resistance soldering apparatus for soldering a workpiece, said apparatus comprising:
    a sheathed-thermocouple first electrode comprising a hollow sheath of a non-solderable material comprising one of stainless steel or Inconel, said sheath being closed at one end, a thermocouple housed within said sheath, said thermocouple being connected to said closed end, said thermocouple otherwise being electrically insulatingly separated from said sheath,
    a second electrode, said first and second electrodes being juxtaposed and terminating on the same side of the workpiece; and
    control means for controlling the heating current applied across said electrodes in a manner dependent on the temperature of said workpiece as sensed by said thermocouple, said control means comprising means to regulate said heating current to achieve controlled cooling of said workpiece.

2. A resistance soldering apparatus for soldering a workpiece, said apparatus comprising:
    a sheathed-thermocouple first electrode comprising a hollow sheath of a non-solderable material comprising one of stainless steel or Inconel, said sheath being closed at one end, a thermocouple housed within said sheath, said thermocouple being connected to said closed end, said thermocouple otherwise being electrically insulatingly separated from said sheath;

a second electrode, said first and second electrodes being juxtaposed and terminating on the same side of the workpiece, said electrodes each having a diameter of less than .070 inch, said electrodes further being maintained in a fixed closely spaced, parallel relation to one another; and, control means for controlling the heating current applied across said electrodes in a manner dependent on the temperature of said workpiece as sensed by said thermocouple, said control means comprising means to interrupt said heating current when said solder reaches a temperature at which it flows smoothly, said control means also comprising means to regulate said heating current to achieve controlled cooling of said solder.

References Cited by the Examiner

UNITED STATES PATENTS

| 1,869,448 | 8/1932 | Woodring | 219—85 X |
| 2,104,749 | 1/1938 | Jones | 219—110 |
| 2,300,700 | 11/1942 | Porter et al. | 219—86 |
| 2,363,719 | 11/1944 | Cooper et al. | 219—110 |
| 2,395,849 | 3/1946 | Collom et al. | 219—110 X |
| 2,550,090 | 4/1951 | Schnepp | 219—85 X |

FOREIGN PATENTS

| 1,001,361 | 1/1957 | Germany. |

RICHARD M. WOOD, *Primary Examiner.*

B. A. STEIN, *Assistant Examiner.*